US 6,600,129 B2

(12) United States Patent
Shen et al.

(10) Patent No.: US 6,600,129 B2
(45) Date of Patent: Jul. 29, 2003

(54) DEVICE AND PROCESS FOR SINTERING A POWDER WITH A LASER BEAM

(75) Inventors: Jialin Shen, Blaubeuren (DE); Jürgen Steinberger, Gröbenzell (DE)

(73) Assignee: DaimlerChrysler AG (DE)

( * ) Notice: Subject to any disclaimer, the term of this patent is extended or adjusted under 35 U.S.C. 154(b) by 0 days.

(21) Appl. No.: 09/788,887

(22) Filed: Feb. 20, 2001

(65) Prior Publication Data
US 2003/0059334 A1 Mar. 27, 2003

(30) Foreign Application Priority Data
Feb. 19, 2000 (DE) .......................... 100 07 711

(51) Int. Cl.[7] ............................................. B23K 26/03
(52) U.S. Cl. ........................ 219/121.61; 219/121.83; 219/121.85
(58) Field of Search .................. 219/121.83, 121.61, 219/121.6, 121.85, 121.76; 264/497; 419/10, 31

(56) References Cited

U.S. PATENT DOCUMENTS

| 5,155,321 | A | * | 10/1992 | Grube et al. | ............. 219/121.6 |
| 5,393,482 | A | | 2/1995 | Benda et al. | ................... 419/1 |
| 5,427,733 | A | * | 6/1995 | Benda et al. | |
| 5,508,489 | A | | 4/1996 | Benda et al. | .......... 219/121.76 |
| 5,790,275 | A | | 8/1998 | Iizuka | |
| 6,188,041 | B1 | * | 2/2001 | Kim et al. | ............. 219/121.83 |
| 6,290,389 | B2 | * | 9/2001 | Schmidt et al. | |
| 6,339,490 | B1 | * | 1/2002 | Hsu et al. | |

FOREIGN PATENT DOCUMENTS

| DE | 19722415 A1 | * | 12/1998 | |
| JP | 62-227589 A | * | 10/1987 | .............. 219/121.8 |

* cited by examiner

Primary Examiner—Geoffrey S. Evans
(74) Attorney, Agent, or Firm—Pendorf & Cutliff

(57) ABSTRACT

A device and process for sintering a powder with a laser beam, and in particular, a rapid prototyping process involving selective laser sintering (SLS), with reduction in non-homogeneities, i.e., grooves or hollows due to complete melting of powder or poor material characteristics due to insufficient melting of powder. The problem is solved by a process and a device for homogenization of the temperature distribution in the part during its manufacture. For this, the temperature of the sinter powder is detected in the sinter point and the power of the laser is controlled depending upon the detected temperature. Geometric changes of the moveable detection area, as well as the changes in the chromatic adjustment, and beam correcting errors, all of which occur depending upon the position of the detection area on the upper surface of the powder bed, are taken into consideration. Thereby a more realistic determination of the temperature values is made possible from the measured temperature values.

13 Claims, 2 Drawing Sheets

DEVICE AND PROCESS FOR SINTERING A POWDER WITH A LASER BEAM

BACKGROUND OF THE INVENTION

The invention concerns a device and a process for sintering a powder with a laser beam. A device and a process for powder with a laser beam are already generally know from EP 0731743 B1, as show in the upper area of FIG. 2.

DESCRIPTION OF THE RELATED ART

In the field of design and prototyping, and the in particular in industrial model construction, the development of new types of more rapid production methods are continuously being sought. One category of this type of rapid production methods is referred to as the rapid prototyping process. This category includes selective laser sintering (SLS). Laser Laser sintering is a process in which material in the form of a powder is at least partially melted by increasing the temperature, so that the individual particles of powder sinter or adhere to each other. In SLS this increase in temperature is achieved by irradiation of the powder with a laser.

The production of a part using SLS occurs in layers. A laser beam with a, substantially constant output is directed in sequential lines over a powder bed and joins the powder particles where it strikes them. In areas in which no sintering is to be achieved, the laser is switched off. As soon as one layer has been completely worked over, the powder bed is lowered and a new layer of powder of is applied.over the preceding—now partially sintered—layer. The just described sequence of process steps are repeated for the present and further applied layers until the, entire construction component has been completely produced.

However, it SLS with substantially constant laser output produces parts with uneven material layer characteristics. It sometimes happens that an area of the powder bed completely melts. This results in grooves or hollows. It likewise sometimes occurs that an area of the powder bed does not sufficiently melt and thus not all particles adhere to each other. This type of uneven sintering leads to non-uniformity in the production process and to poor material characteristics.

For compensation of this problem it has been proposed, in EP 0731743 B1, to detect the temperature of the powder in a moveable detection manner in the area of the sintering position and to control the output of the laser depending upon the detected temperature, in order to homogenize the temperature balance of the part during the manufacturing process. For this, the radially symmetric emitted temperature radiated from the sinter position is directed over the same scanner-mirror as the laser beam, thereafter is decoupled by means of a dichromatic beam splitter and focused upon a IR-sensor via a lens.

Compensating in accordance with EP 0731743 B1 improves the construction quality; however, non-homogeneities nevertheless occur, which cannot be tolerated in applications with high quality requirements, and thus commercial applications of this technology are limit.

In U.S. Pat. No. 5393482 and in the corresponding U.S. Pat. No. 5508489 processes and a device are described for sintering a powder with two superimposed laser beams—one focused and one defocused laser beam—as well as with multiple temperature detection areas.

SUMMARY OF THIS INVENTION

The task of the present invention is comprised of providing a device and a process for sintering a powder with a laser beam including a temperature detecting surface, which are capable of further reducing the occurrence of.this type of non-homogeneity.

A task is inventively solved with respect to the device to be provided in that the device for sintering a powder with a laser beam comprises a device for production of a laser beam, which beam impinges upon the upper surface of a powder along a moveable sinter position, a device for detecting, along a moveable detection position, the temperature of the powder in the area of the sinter position, a device for regulating the laser beam, which regulates the output of the laser beam depending upon a signal from the device for detecting the temperature of the powder, and further a device for compensation for position-dependent errors in temperature detection, which device for compensation takes into consideration at least one of the following sources of error depending upon the position of the detection area on the upper surface of the powder:

the geometric changes of the moveable detection area, which depend upon the position of the detection area on the upper surface of the powder bed, the chromatic error, which is brought about by a variable strength of the bundling effect of the employed optical system at the various wavelengths of the laser beam and the thermal radiation, the correction errors, which occur almost unavoidably in practice during the co-axial adjustment of both beams.

A constant surface relationship between the laser spot and the thermal radiating detection .area is essential for correct temperature detection.

If the focusing of the laser beam occurs via a simple lens or a lens system, then this is conventionally optimized for the center point within the construction field. For the outer or peripheral areas of the construction field, there results thus an enlargement and a dissipation of the laser spot and therewith the sinter position, since the laser beam widens outside of its focus point and beside this impinges upon the upper surface of the construction field with a tilt angle. For the attainment of a constant sinter quality over the entire construction field, a suitable optical system is thus used for compensating for the widening of the laser beam and the therefrom resulting changing of the geometry of the laser spot and the sinter position, via which optical system the focus of the laser beam is controlled.

A similar position dependency occurs in the detection of the IR-radiation emitted upwards from the moveable detection area, wherefrom—without taking this into consideration—errors in the temperature detection result.

When the laser beam and the temperature signal are directed over the same optical system, then the geometric changes of the sinter position and the detection area should remain almost constant (as long as the relative position of the two beams does not change).

The position dependency of the geometry of the detection area can be better understood by the example set forth in the following text and in FIG. 1:

Assuming that in the starting position the laser beam impinges at sinter position Si perpendicularly upon.the upper surface of the powder bed. The detection area E1 is likewise detected from a perpendicular perspective. The thermal radiation emitted from the upper surface of the powder bed, as proposed in EP 0731743 B1 is directed over the same scanner mirror as the laser beam, then is however decoupled from the laser optical system and focused via its own lens system. The lens system is so designed, that it forms a circular observation window; in accordance therewith the detection area in the starting position likewise appears circular. During the sinter process the laser beam is then guided to sinter position S2, there it umpinges with a particular tilt angle upon the upper surface of the powder bed. The observation window now as before is circular, due to the tilt relative to the upper surface there results now however a distorted detection area E2, which exhibits an elliptical shape and due to the larger distance of the upper surface to the focus system, which is optimized to the distance to the construction field sinter, E2 now is significantly larger than E1.

The laser beam is moved along.lines. It is of importance which direction this line of movement has relative to the main axis of the ,ellipse of the detection area. The portion of a hot sinter line L on a detection area E is maximal (assuming equal size of the detection area) when the sinter line and the main axis of the ellipse coincide (L3:E3); it is minimal, when they .are perpendicular to each other (L4:E4). Even when the laser and the thermal radiation are directed, through the same optical system, the surface relationship from the laser spot to the temperature detection area changes and therewith the detected temperature: when the temperature detection area is larger by a, factor of between 1 and 1.41 than the laser spot, in the position E4 a higher temperature is indicated. If this factor increases beyond 1.41, then in position E3 a higher temperature is indicated. Only when the factor is coincidentally precisely 1.41, then the indicated temperature remains independent of the position. In two elliptical detection areas of the same size (E3 and E4) there can accordingly with identical laser outputs nevertheless be detected different temperatures Accordingly, in accordance with this example, the position dependence is radial-symmetric to the shape of the detection area, however not the temperature detection, rather this is inhomogeneous depending upon the tilt angle of the laser beam as well as depending also upon the position of the detection position on the construction field.

A further source of error is chromatic error. Typically in laser sintering a $Co_2$-laser is employed with a wavelength of 10.6$\mu$m. The thermal radiation for temperature detection exhibits a wavelength of from 1 to 10 $\mu$m. When performing temperature detection it is attempted to extract the wavelength 10.6 $\mu$m by a suitable filter, in order to exclude errors introduced by the laser. The focusing effect of the optical system is as a rule, different at differing wavelengths. When the temperature detection area is moved from the construction, field center towards the rim, the tilt angle and therewith the difference of the defocusing of both beams increases. The surface relationship from laser spot to temperature detection area changes therewith depending.upon position.

Before one can measure the temperature, one must take care, that the laser and temperature beam are adjusted co-axially. In practice, even after a careful correction, a residual error always remains This error is increased with increasing tilt angles. Therewith there results a greater position-dependent measurement error of the temperature.

A device which would compensate for position dependent errors in temperature measurement, that is, at least one of the error sources a) geometry of the detection area (shape, size and orientation of the main axis of the detection area), b) chromatic error, c) adjustment error, would make possible the more realistic determination of temperature values from the measured temperature values as compared to a temperature determination according td the state of the art according to EP 0731743 B1 that is, compared to a temperature determination without taking into consideration any of these sources of error. The integration into one single device is particularly advantageous on a construction and economical basis, and provides surprisingly good results in the temperature detection. This makes possible a substantially improved control of the laser output, wherefrom again a substantially improved construction quality results.

In an advantageous embodiment of the inventive device, the assembly for taking into consideration the geometry of the moveable detection area comprises an assembly for receiving a data table or set, wherein stored in the data table are: correction factors with respect to at least one of the error sources of: geometry of the moveable detection area, chromatic error, and correction error depending upon the position of the detection area on the upper surface of the powder.

By means of such a device for recording a table, or directly with such a table, the respective corrective factor can be determined or designated for every single position of the detection area on the upper surface of the powder, by a simple interpolation between near-lying positions for which the correction factors are already recorded in the table. A subsequent taking into consideration of the position dependent error is thus substantially simplified. Individual values of this table can be easily determined experimentally. This is in particular of advantage in the case of complex optical system, since here a calculation of the geometry parameters of the detection area would be time consuming.

In a further.advantageous embodiment of the inventive device, the unit for compensation includes a unit for insuring that the size of the moveable detection area is maintained essentially constant, independent upon the position of the detection area on the upper surface of the powder.

Herein—on the basis of the taking into consideration and compensation of the positional dependence of the size of the detection are—an erroneous determination of the temperature is already minimized in the set up.

In special arrangements or designs of this advantageous embodiment of the inventive device, the unit for guaranteeing is realized in the form of a unit for dynamic refocusing of the moveable detection area or as F-theta-optical system. The first mentioned unit compensates the image field curvature or distortion by positional dependent movement of a concave lens. The last mentioned unit compensates the image field curvature or distortion by a combination of concave and convex lenses.

In a further advantageous embodiment of the, inventive device, the unit for detecting the temperature of the powder is realized in such a manner that it detects one temperature, which is averaged over the detection area. For the majority of the application cases an averaged temperature value is a sufficient measurement for regulating or controlling the laser output.

In a further advantageous embodiment of the inventive device, the unit for detecting the temperature of the powder is a pyrometer. A pyrometer is a comparatively simple, robust and easy to operate unit for detecting the temperature.

The task of the invention with respect to the process for sintering a powder with a laser beam to be provided is inventively solved thereby, that it includes the following steps guiding of the laser beam along a moveable sinter point, on an upper surface of the powder, detecting the temperature of the powder in a moveable detection area in the area of the sinter point, controlling the output or power of the laser beam depending upon the detected temperature of the powder, as well as
   compensating for the positionally dependent errors in the temperature determination as already mentioned with respect to the device.

The basic principle of the inventive process; is comprised therein, that the positionally dependent errors in the temperature detection can be compensated. These are: the geometric changes in the moveable detection area as well as chromatic and correction (fudge factor) errors, which occur or appear depending upon the position of the detection area on the upper surface of the powder bed. Thereby the determination of a substantially realistic temperature value is made possible based on the measured temperature value.

In an advantageous embodiment of the inventive process correction factors with respect to at least one of the error sources of: geometry of the moveable detection area, chromatic error, and correction error depending upon the position of the detection area on the upper surface of the powder, are read from a table of correction factors. The advantages resulting therefrom were already mentioned in the discussion of the corresponding device.

In a further advantageous embodiment of the inventive process the size of the moveable detection area is maintained relatively constant depending upon of the position of the detection position upon the upper surface of the powder. Thereby—on the basis of taking into consideration and compensating for the position dependent size of the detection area—an error determination of the temperature is minimized already in the setup. A further influencing parameter (shape and orientation of the moveable detection area, chromatic aberration as well as correction errors) are for example read out from the table, taken into consideration, and likewise compensated, from which an optimal temperature determination results.

In special configurations or designs of this advantageous embodiment of the inventive process, the size of the moveable detection area is maintained constant by means of a dynamics refocusing of the moveable detection area or by means of an F-Theta-Optical system.

In a further advantageous embodiment of the inventive process, a temperature averaged over the detection area is determined. Thereby the control or regulation of the laser output occurs with sufficient precision but comparatively simply.

BRIEF DESCRIPTION OF THE DRAWINGS

In the following the inventive device and the inventive process will be described in greater detail on the basis of the illustrated embodiment and the figures. There is shown in.

DETAILED DESCRIPTION OF THE INVENTION

Figure 1:
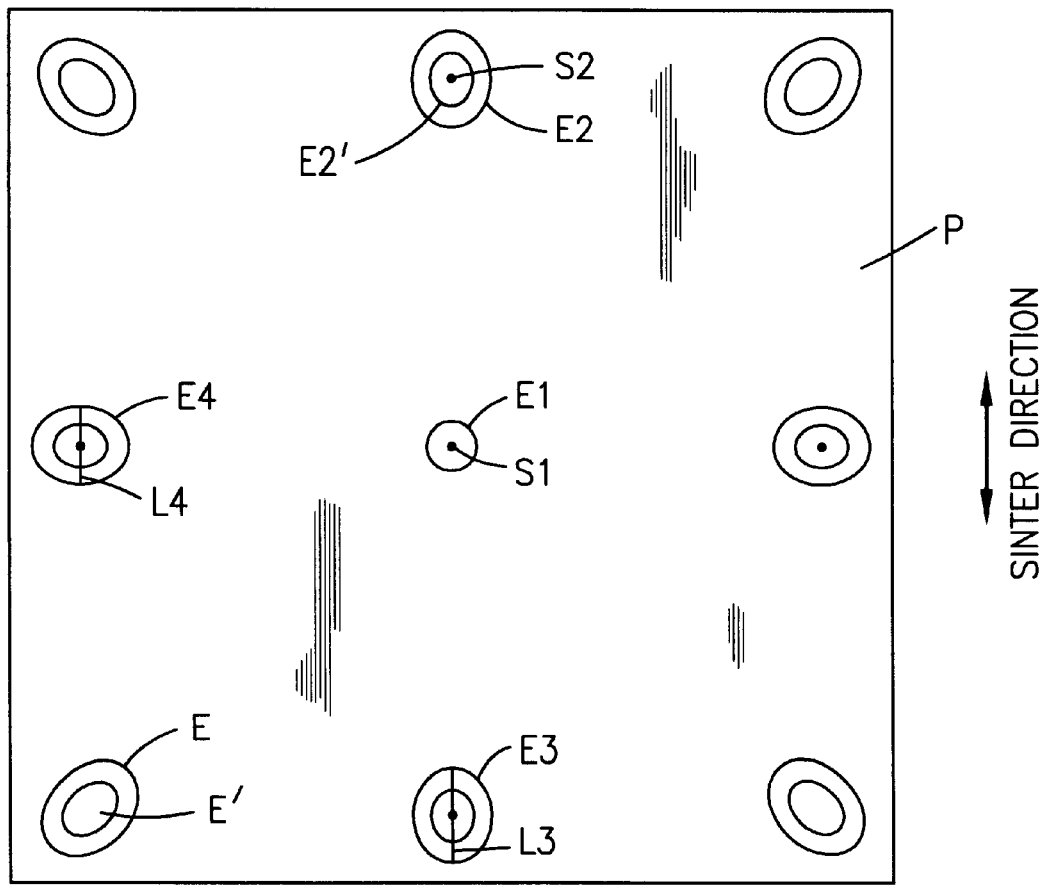
FIG. 1 the change in the geometry of the detection area E depending upon the position upon the powder upper surface, and FIG. 2 a device for carrying out the present invention, including an f-theta optical system.
Figure 2:
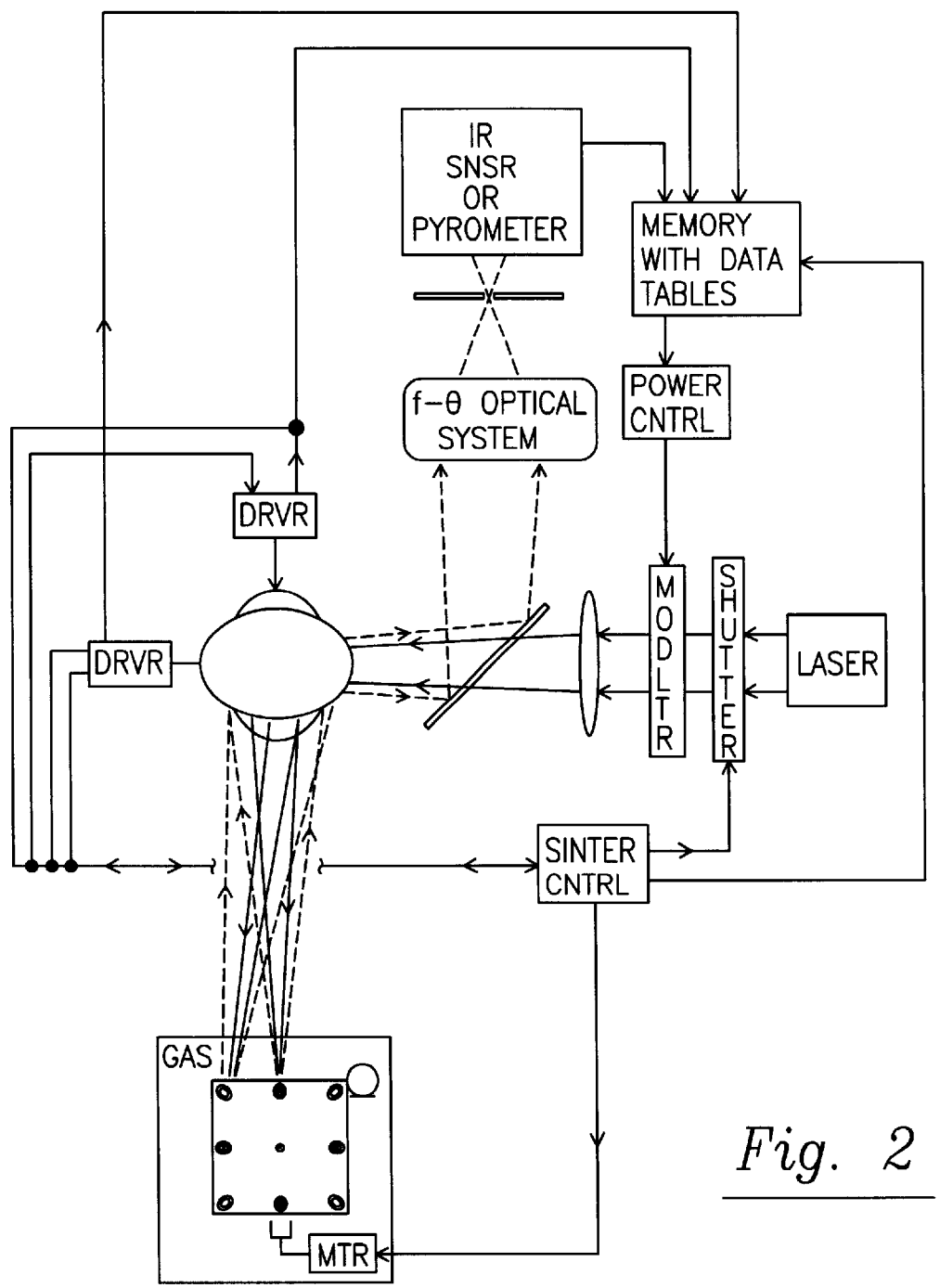

In SLS, when using a device and a process according to the state of the art, the geometry of the detection area E changes as shown in FIG. 1:

In a starting position the laser beam impinges on a sinter position S1 perpendicular onto the upper surface of the powder bed. The detection area E1 is detected by means of the same optical system and therewith likewise from a perpendicular perspective.

The above described positional dependence of the size of the sinter position and the, size of the detection position are compensated by means of a F-Theta-Optical system, which evens out the image field curvature or distortion and thus produces a detection area E with a substantially constant size—independent of its position on the upper surface of the powder bed. The further influence parameters (shape and orientation of the moveable detection area, chromatic aberrations as well as correction errors) are read from a table and taken into consideration in that they are computer compensated, wherein an optimal temperature determination results. The influence parameter and the correction factor thereof were previously determined empirically and/or theoretically.

During the sintering process, the laser beam is next guided to a sinter position S2, there it impinges upon the upper surface of the powder bed with a certain tilt angle. The observation window for detecting the temperature is, now as before, circular shaped and due to the tilt of the upper surface there results a distorted detection area E2', which exhibits an elliptical shape. The enlarging of the detection area E2' is however compensated by the F-Theta-Optical system and thereby errors in the temperature determination of the areas of the upper surface relevant to the sintering are minimized. In FIG. 1 there are respectively shown the uncorrected detection areas E (outer ellipse) and the corrected detection area E (inner ellipse).

By the substantially constant size of the detection area E the detection of a temperature value averaged over the entire detection area E is completely sufficient for providing a qualitatively highly useful and effective control of the laser output.

The detection of the temperature in this example occurs by means of pyrometer. Depending upon the detected temperature the laser output is controlled or regulated by modulation of the laser pulse width. The focusing of the laser beam and detection area occurs in this example via the same optical system.

The inventive device and the inventive process have proven themselves in the illustrative embodiments as described in the above example as particularly suitable for the optimization of the control of the laser output in conventional SLS as described for example in EP 0731743 B1.

The invention is not limited to the above described illustrated embodiment, but rather finds various applications.

Thus it can be envisioned f or example, as proposed in EP 0731743 B1, to partially or completely decouple the temperature detection out of the optical system of,the laser and to direct this over a separate optical system. This is advantageous when the conventionally employed anti-reflection layers of the laser optics could cause a too strong a dampening of the temperature signal. Besides this, by separation, the two optical systems can be independently optimized and therewith made more effective for their respective tasks or requirements. Important in this variation is however that—in contrast to EP 0731743, B1—a taking into consideration of the positional dependence of the detection area E occurs, for example in combination with a narrow. F-Theta-Optical system or an assigned dynamic refocusing.

Besides this, a special pyrometer—a so called quotient pyrometer, can be of advantage. A quotient pyrometer measures two wavelengths and can thus—by the appropriate selection from the two wavelengths—distinguish or discriminate the hot sinter line from the rest of the detection area. Herewith a further taking into consideration of the geometric parameters and therewith a further minimization of the error source of the temperature detection is made possible.

What is claimed is:

1. A device for sintering a powder with a laser beam, comprising:
   a device for production of a laser beam (L), which beam impinges upon the upper surface of a powder (P) along a moveable sinter position (S),
   a device for detecting, along a moveable detection position V(E), the temperature of the powder (P) in the area of the sinter position (S),
   a device for regulating the laser beam (L), which regulates the output of the laser beam (L) depending upon a signal output by the device for detecting the temperature of the powder (P), wherein the device further comprises
   a device for compensating for position-dependent errors in temperature detection, which device for compensating takes into consideration at least one of the following sources of error depending upon the position of the detection area on the upper surface:of, the powder:
   the change in the geometry of the moveable detection area (E),
   the chromatic error due to the difference in the bundling strength with the employed optical system with the differing wavelengths of the laser beam and the thermal radiation,
   the adjustment errors which occur during the co-axial adjustment of the laser and thermal beams.

2. Device according to claim 1, wherein the device for compensating includes:
   a device for recording a data table, wherein stored in the data table are correction factors with respect to at least one of the following sources of error:
   geometry of the moveable detection area (E),
   chromatic error, and
   correction error, depending upon the position of the detection area (E) on the upper surface of the powder (P).

3. Device according to claim 1, wherein the device for compensating includes:
   a device for verifying, that the size of the moveable detection area (E) is maintained essentially constant, independent of the position of the detection area (E) on the upper surface of the powder (P).

4. Device according to claim 3, wherein the device for verifying comprises a device for,dynamic refocusing of the moveable detection surface (E).

5. Device according to claim 3, wherein the device for verifying comprises an F-theta-optical system.

6. Device according to claim 1, wherein the device for detecting the temperature of the powder (P) is constructed in such a manner that it detects the temperature that is averaged over the detection area (E).

7. Device according to claim 1, wherein the device for detecting the temperature of the powder (P) is a pyrometer.

8. Process for sintering a powder (P) with a laser beam (L) includes the following steps:
   guiding of the laser beam (L) along a moveable sinter point (S) on an upper surface of the powder (P),
   detecting the temperature of the powder (P) in a moveable detection area (E) in the area of the sinter point (S),
   controlling the output or power of the laser beam depending upon the detected temperature of the powder,
   adjusting the output of the laser beam (L) depending upon the detected temperature of the posder (P),
   wherein
   position-dependent errors in temperature detection are compensated for by taking into consideration at least one of the following sources of error depending upon the position of the detection area on the upper surface of the powder:
   the change in the geometry of the moveable detection area (E),
   the chromatic error due to the difference in the bundling strength with the employed optical system with the differing wavelengths of the laser beam and the thermal radiation,
   the adjustment errors which occur during the co-axial adjustment of the laser and thermal beams.

9. Process according to claim 8, wherein correction factors for least one of the positionally dependent sources of error is read from the table and taken into consideration depending upon the position of the detection area (E) on the surface of the powder (P).

10. Process according to 9, wherein the size of the moveable detection area (E) is maintained essentially constant, independent of the position of the detection area (E) on the surface of the powder (P).

11. Process according to, claim 10, wherein the size; of the moveable detection surface is maintained essentially constant by dynamic refocusing.

12. Process according to claim 10, wherein the size of the moveable detection surface is maintained essentially constant using an F-theta-optical system.

13. Process according to claim 8, wherein the detected temperature is averaged over the detection area (E).

* * * * *